(12) United States Patent
Proidl et al.

(10) Patent No.: US 8,707,360 B2
(45) Date of Patent: Apr. 22, 2014

(54) METHOD AND APPARATUS FOR PLAYBACK OF CONTENT ITEMS

(75) Inventors: Adolf Proidl, Vienna (AT); Rudy Roth, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 319 days.

(21) Appl. No.: 12/532,209

(22) PCT Filed: Mar. 13, 2008

(86) PCT No.: PCT/IB2008/050918
§ 371 (c)(1),
(2), (4) Date: Sep. 21, 2009

(87) PCT Pub. No.: WO2008/114176
PCT Pub. Date: Sep. 25, 2008

(65) Prior Publication Data
US 2010/0050206 A1    Feb. 25, 2010

(30) Foreign Application Priority Data
Mar. 21, 2007   (EP) .................................... 07104582

(51) Int. Cl.
*H04N 5/445*   (2011.01)

(52) U.S. Cl.
USPC .............................................. 725/41; 725/55

(58) Field of Classification Search
USPC ....................................... 725/41, 55
See application file for complete search history.

(56) References Cited

U.S. PATENT DOCUMENTS

| 8,037,494 B2 * | 10/2011 | Sie et al. ......................... 725/45 |
| 2002/0124249 A1 * | 9/2002 | Shintani et al. ................. 725/32 |
| 2004/0128317 A1 | 7/2004 | Sull et al. |
| 2004/0255336 A1 | 12/2004 | Logan et al. |
| 2005/0094031 A1 * | 5/2005 | Tecot et al. .................... 348/473 |
| 2008/0172693 A1 * | 7/2008 | Ludvig ............................ 725/40 |
| 2008/0195664 A1 * | 8/2008 | Maharajh et al. ........... 707/104.1 |
| 2008/0200154 A1 * | 8/2008 | Maharajh et al. ........... 455/414.3 |
| 2008/0201225 A1 * | 8/2008 | Maharajh et al. ............... 705/14 |

FOREIGN PATENT DOCUMENTS

WO          0040021  A1     7/2000

* cited by examiner

*Primary Examiner* — Kieu Oanh T Bui

(57) ABSTRACT

The present invention relates to simultaneously playing back a plurality of content items, wherein preferred content items can be played back in overlays (203, 205, 207, 209) alongside a main screen area (201) playing back a currently selected content item.

10 Claims, 2 Drawing Sheets

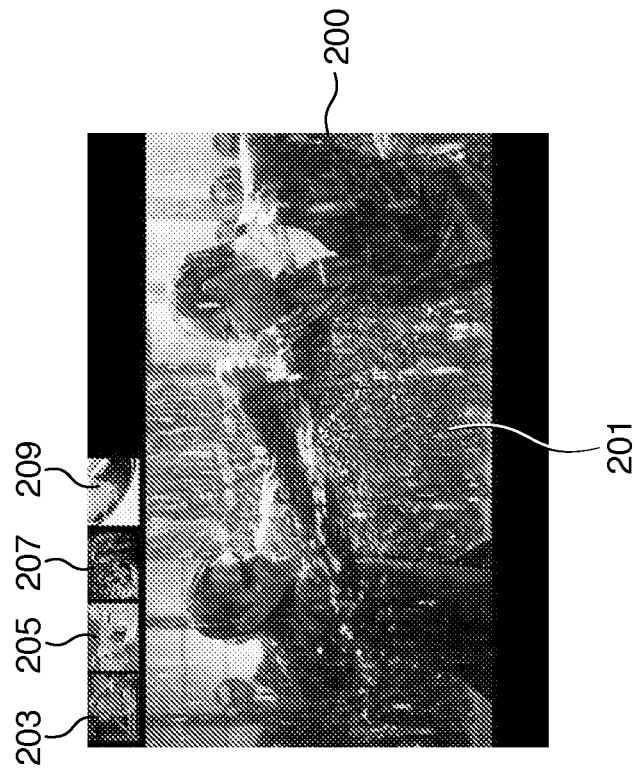
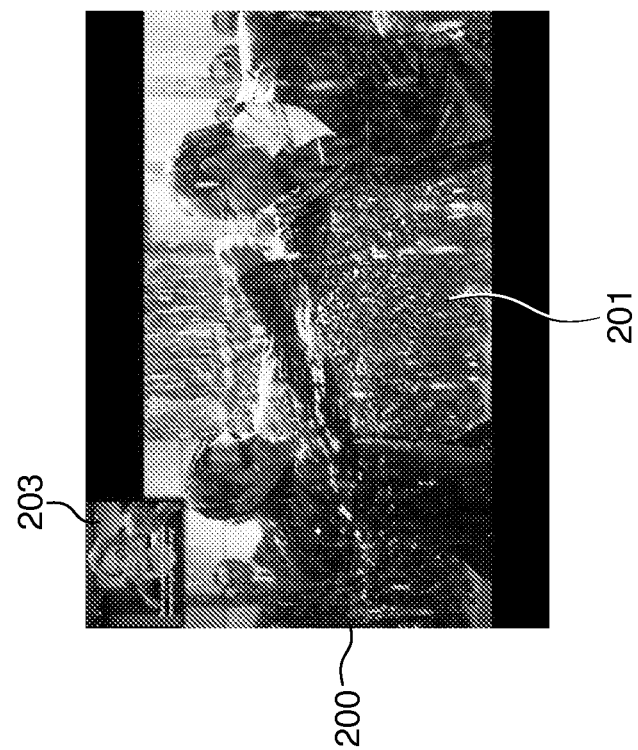
FIG. 2b
FIG. 2a

METHOD AND APPARATUS FOR PLAYBACK OF CONTENT ITEMS

FIELD OF THE INVENTION

The present invention relates to method and apparatus for playback of content items. In particular, it relates to playback, simultaneously, of at least two content items.

BACKGROUND OF THE INVENTION

The use of video mosaics to show an overview of all available cable or satellite channels, including the option of selection of one of those channels from the mosaic is well known, for example, http://wiki.videolan.org/index.php/Mosaic, http://www.radioexe.com/video_mosaic/html/video_mosaic.htm and US 20040255336.

Further, the generation and maintenance of personal channels is well known, for example in Apple's iTunes computer program, RSS newsreaders, and Philips "Virtual Channel" technology (WO2000/040021, amongst others) in which a user can predefine preferred content for inclusion in a content channel.

Although personal television channels (enabled by "Virtual Channel" technology) allow the user easily to aggregate desired content from broadcast TV, and to consume it in a familiar way, it is not possible to get an instant and comprehensive video overview of all content available in all personal television channels at a particular point in time.

SUMMARY OF THE INVENTION

The present invention seeks to provide a system in which the user is able to make a better selection out of available content.

This is achieved, according to an aspect of the present invention by a method for playback of a plurality of content items, the method comprising the steps of: playback of a currently selected content item; playback, simultaneously, of current content of at least one other content item, the at least one other content item being a preferred content item.

This is also achieved, according to a second aspect of the present invention, by an apparatus for playback of a plurality of content items, the apparatus comprising: playback of a currently selected content item; playback, simultaneously, of current content of at least one other content item, the at least one other content item being a preferred content item.

In this way the user is provided with an instantaneous overview of a plurality of content items. In particular, an overview of a preferred content item, such a preferred content item may be an item which has a characteristic which falls within criteria of a user-defined profile or one which is specifically marked by the user as desirable. For example, the preferred content item may be an item of content of a personalized content channel.

In an embodiment of the present invention, simultaneous playback is triggered automatically, for example, by commencement of a recording and/or by said at least one other content item becoming available, e.g. as video-on-demand content. The latter may be indicated in an RSS feed. When said at least one other content item becomes available, it may automatically be downloaded and recorded locally.

BRIEF DESCRIPTION OF DRAWINGS

For a more complete understanding of the present invention, reference is made to the following description in conjunction with the accompanying drawings, in which:

FIGS. 2a and 2b are an illustration of examples of a user interface of the apparatus according to an embodiment of the present invention; and

DETAILED DESCRIPTION OF AN EMBODIMENT OF THE INVENTION

Figure 1:
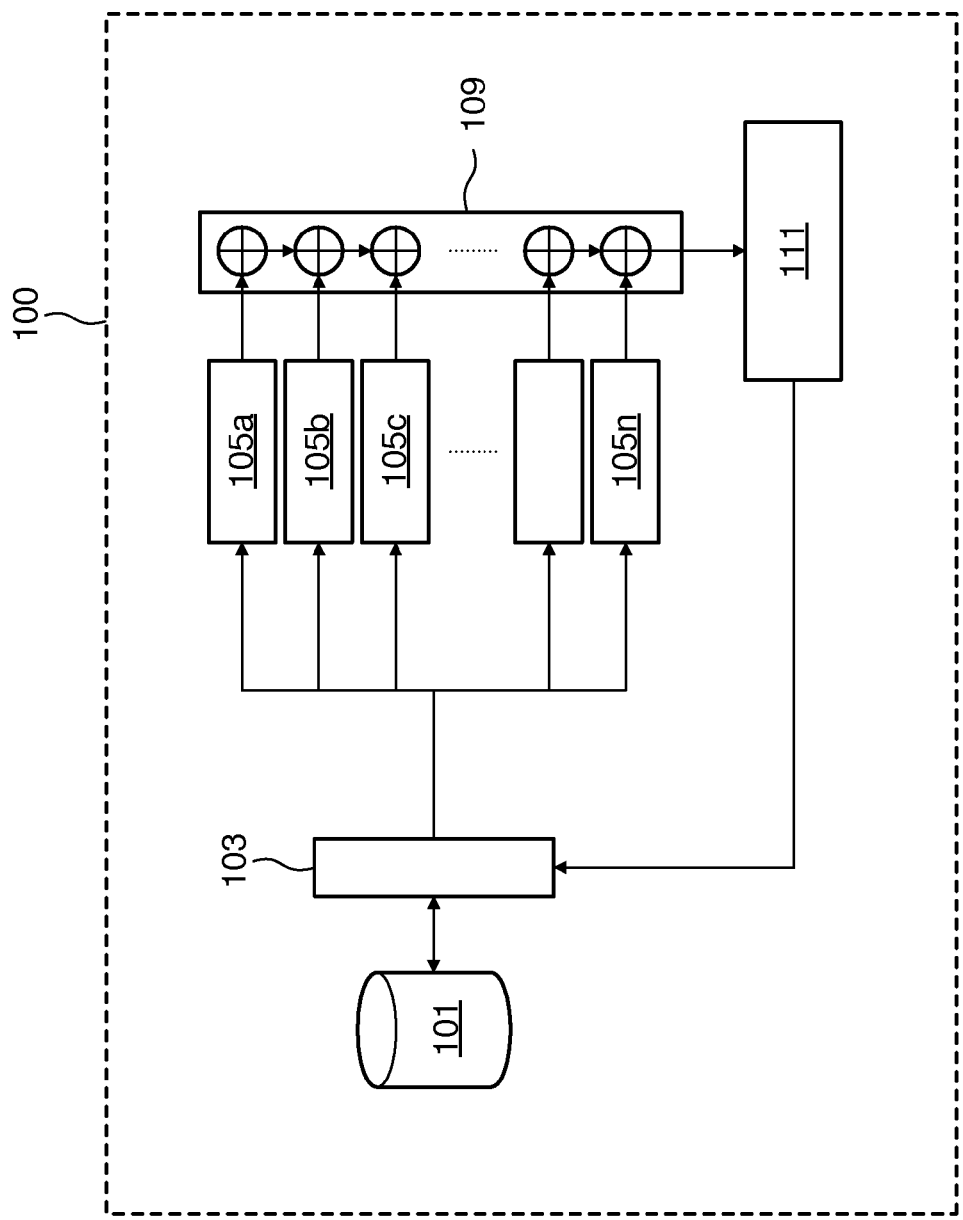
FIG. 1 is a simplified schematic of apparatus according to an embodiment of the present invention.

FIG. 1 is a simplified schematic of apparatus according to an embodiment of the present invention. In this embodiment, the apparatus 100 comprises means 101 for recording a content item. The recording means 101 may comprise a high density disk or other suitable digital storage means. The output of the recording means 101 is connected to a stream controller 103. The output of the stream controller 103 is connected to the inputs of a plurality of partial video decoder 105a, 1105b, 105c . . . , 105n and a full audio/video decoder 107. The outputs of the plurality of partial video decoders 105a, 105b, 105c, . . . , 105n and the output of the full audio/video decoder 107 are connected to summation means 109. The output of the summation means 109 is connected to a user interface 111.

The user interface 111 is connected to the stream controller 103. The user interface 111 comprises a display screen for viewing playback of content items and means for enabling user input, such as a remote control device, or touch-sensitive areas on the screen or any other control input device.

In operation, the user selects a current content item for playback/viewing on the display screen via the input control device, for example viewing a TV program. The selection made by the control input device of the user interface 111 is input into the stream controller 103 which assesses the recording means 101 to output the selected item to the audio/video decoder 107. In an alternative embodiment, no recording means is used, but only live content and/or streamed network content is shown. The content item is decoded for display on the screen of the user interface 111. This is displayed on the main area 201 of the screen 200 as shown, for example, in FIGS. 2a and 2b.

On commencement of a recording, the stream controller 103 is automatically triggered. The preferred content item may be one which has characteristics which meet a user profile, e.g. an action movie, or an item specifically marked by the user, e.g. an item marked for recording. In an alternative embodiment, the stream controller 103 is additionally or alternatively automatically triggered by new preferred content becoming available which may be indicated in an RSS feed, for example.

The preferred content item is then partially decoded by the first partial decoder 105a. This is then added in the summation means 109 to the current content item so that both items can be played back, simultaneously, by the user interface 111. As shown in FIG. 2a, the preferred content item is played back in an overlay 203.

The user may then acknowledge the overlay 203 with a remove request such that it is no longer shown on the display screen 200. The recording may be continued after the overlay 203 has been removed. Alternatively, the user may ignore the overlay 203 and after a timeout period the size of the overlay 203 is reduced, but it remains visible as shown in FIG. 2b. Or alternatively, the user acknowledges the overlay 203 with a swap request such that the playback of the current content item is paused and the content of the overlay 203 and the full screen 201 is swapped. The user can reverse the swap operation by repeating the swap request.

Upon commencement of another recording before the first has finished, the stream controller is automatically triggered to retrieve the new preferred content item. This is partially decoded by the second partial decoder 105b. This is then added in the summation means 109 to the current content item and to the first preferred content item in a second overlay 205.

As a result and as illustrated in FIG. 2b, if there is already an overlay 205, 207, 209 of an ongoing recording, when another recording commences, the new recording is overlaid 203 next to the old small recording 205, 207, 209 in the same way as the first new recording was overlaid when it started.

As soon as a recording has completed, its corresponding overlay is removed.

While there are overlaid recordings being displayed during full screen playback, the user can always navigate to these recordings and request various operations, including the swap operation, to be executed. Navigation highlighting may occur be means of enlarging the overlay, for example.

Alternatively this functionality can be restricted by the user, for example to show only new content being recorded for the same channel and only if the genre of the channel is "news", or the user might be able to disable the functionality completely for a playback session, e.g. movie playback during the "movie evening" party.

Although an embodiment of the present invention has been illustrated in the accompanying drawings and described in the foregoing detailed description, it will be understood that the invention is not limited to the embodiment disclosed, but is capable of numerous modifications without departing from the scope of the invention as set out in the following claims. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A method for playback of a plurality of content items, the method comprising the steps of:
    playback of a currently selected content item;
    upon commencement of said playback, selection and simultaneous playback of video of current content of at least one other content item, said at least one other content item being a preferred content;
    wherein said selection and simultaneous playback of current content of at least one other content item is triggered automatically; and,
    wherein both the currently selected content item playback and the at least one other content item playback appear on a video screen at the same time.

2. A method according to claim 1, wherein said selection and simultaneous playback of current content of at least one other content item automatically triggered by said at least one other content item becoming available.

3. A method according to claim 1, wherein the method further comprises the steps of:
    selecting by a user one of said at least one other content item; and
    executing an operation on said selected content item.

4. A method according to claim 3, wherein the step of executing an operation on said selected content item comprises the steps of
    pausing playback of said current content item; and
    making said selected one of said at least one other content item said currently selected content item.

5. A method according to claim 1, wherein said at least one other content item matches at least one user-defined characteristic.

6. A method according to claim 1, wherein each content item is played back on a content channel and said preferred content item is played back on a personal content channel.

7. A computer program product comprising a plurality of program code portions for carrying out the method according to claim 1.

8. Apparatus for playback of a plurality of content items, the apparatus comprising:
    means for playback of a currently selected content item;
    means for upon commencement of said playback, selecting and simultaneous playback of video of current content of at least one other content item, said at least one other content item being a preferred content item; wherein said selection and simultaneous playback of current content of at least one other content item is triggered automatically; and,
    wherein both the currently selected content item playback and the at east one other content item playback appear on a video screen at the same time.

9. Apparatus according to claim 8, wherein the apparatus further comprises:
    means for playing back con e t items stored in a network, wherein said selection and simultaneous playback of current content of at least one other content is automatically triggered by said at least one other content item becoming available, 10. Apparatus according to claim 8, wherein the apparatus further comprises:
    means for selecting one of said at least one other content item; and
    means for executing an operation on said selected content item.

* * * * *